(12) United States Patent
Klotz et al.

(10) Patent No.: US 11,097,904 B2
(45) Date of Patent: Aug. 24, 2021

(54) DISTRIBUTION CONVEYING DEVICE

(71) Applicant: SIDEL CANADA INC., Laval (CA)

(72) Inventors: Franck Klotz, Laval (CA); Sophie Tisseaux, Laval (CA)

(73) Assignee: SIDEL CANADA INC., Laval (CA)

(*) Notice: Subject to any disclaimer, the term of this patent is extended or adjusted under 35 U.S.C. 154(b) by 159 days.

(21) Appl. No.: 15/771,890

(22) PCT Filed: Nov. 30, 2015

(86) PCT No.: PCT/IB2015/002265
§ 371 (c)(1),
(2) Date: Apr. 27, 2018

(87) PCT Pub. No.: WO2017/093775
PCT Pub. Date: Jun. 8, 2017

(65) Prior Publication Data
US 2018/0312346 A1    Nov. 1, 2018

(51) Int. Cl.
*B65G 47/52* (2006.01)
*B65G 47/71* (2006.01)
(Continued)

(52) U.S. Cl.
CPC ............ *B65G 47/52* (2013.01); *B25J 9/0093* (2013.01); *B65G 47/71* (2013.01); *B65B 43/46* (2013.01);
(Continued)

(58) Field of Classification Search
CPC combination set(s) only.
See application file for complete search history.

(56) References Cited

U.S. PATENT DOCUMENTS 2,346,583 A   4/1944  Jackson
2,465,690 A   3/1949  Lyon
(Continued)

FOREIGN PATENT DOCUMENTS

DE  10 2007 022 910 A1   11/2008
DE  10 2013 013 809 A1    2/2015
(Continued)

OTHER PUBLICATIONS

International Search Report, dated Jul. 27, 2016, from corresponding PCT application No. PCT/IB2015/002265.
(Continued)

*Primary Examiner* — Kyle O Logan (57) ABSTRACT

Disclosed is a conveying device, for conveying products in an industrial processing line, the conveying device including, for circulating the products, at least one infeed conveyor, for receiving the products from a line portion upstream the device and a plurality of outfeed conveyors, for further delivering the products to a line portion downstream the device, the conveying device acting as a sorting device and directing product to a predefined outfeed conveyor. The infeed conveyor and the plurality of outfeed conveyors extend in a common plane, the conveying device further including a robotic unit, with a working area covering at least a portion of the at least one infeed conveyor and at least a portion of each outfeed conveyor, for moving products from the at least one infeed conveyor to a predefined outfeed conveyor of the plurality, with a movement parallel to the common plane. Also disclosed is a corresponding method.

20 Claims, 6 Drawing Sheets

(51) Int. Cl.
  *B25J 9/00* (2006.01)
  *B65B 43/46* (2006.01)
  *B65B 43/52* (2006.01)

(52) U.S. Cl.
  CPC ...... *B65B 43/52* (2013.01); *B65G 2201/0235* (2013.01)

(56) References Cited

U.S. PATENT DOCUMENTS

| | | | | |
|---|---|---|---|---|
| 3,160,259 | A * | 12/1964 | Dalton | B65G 47/82 198/432 |
| 3,717,239 | A * | 2/1973 | Carter | B65G 47/71 198/374 |
| 4,484,289 | A | 11/1984 | Hemond | |
| 6,578,705 | B2 * | 6/2003 | Lunghi | B65G 15/00 198/810.04 |
| 7,233,838 | B2 * | 6/2007 | Barry | B25J 18/04 198/346.1 |
| 7,997,401 | B2 | 8/2011 | Fischer | |
| 8,833,545 | B2 | 9/2014 | Perl | |
| 2006/0178774 | A1 * | 8/2006 | Reznik | B07C 5/36 700/224 |
| 2009/0065330 | A1 * | 3/2009 | Lupton | B65G 43/08 198/357 |
| 2011/0083939 | A1 * | 4/2011 | Huber | B65G 47/084 198/418 |

FOREIGN PATENT DOCUMENTS

| | | |
|---|---|---|
| EP | 1 634 827 A1 | 3/2006 |
| EP | 1 767 474 A2 | 3/2007 |
| JP | 63-165219 A | 7/1988 |
| WO | 2008/138556 A2 | 11/2008 |

OTHER PUBLICATIONS

Third Party Observation regarding priority PCT Application No. PCT/IB2015/002265, dated Jun. 14, 2017.

* cited by examiner

DISTRIBUTION CONVEYING DEVICE

The current invention belongs to the domain of conveying products within an industrial processing line. The object of the present invention is a conveying junction device for bringing products from an infeed conveyor to an outfeed conveyor, as well as a corresponding working process.

The invention is mainly concerned with industrial packaging lines in which products like boxes, cartons, crates, etc., are conveying between processing machines. In this field, conveying products between processing machines is usually performed with endless belts, on the top surface of which products stand.

As products can require specific treatments, the line comprises junctions from which incoming products are further brought to different downstream portions. In such junction areas, a single entering column is split in a plurality of columns, depending of the specific process each product has to follow.

For example, DE102013013809 describes a single conveyor moving products. A gantry extends above said conveyor and is equipped with a diverter moving perpendicular to the direction of said conveyor. When necessary, this diverter pushes the conveyed products closer to one side or the other of the conveyer. The diverting possibilities are however very limited: it is only possible to have a transversal shift on the same conveyor. This structure is also difficult to adapt to new line layouts.

WO2008138556 describes an installation between a packaging machine and a set of palletizers, using a complex diverting principle based on a closed loop accumulation, in which products are received as a single column and later delivered by said accumulation along different possible columns. The footprint of this principle is however important.

EP1767474 describes a working principle based on two infeed conveyors and two outfeed conveyors. An intermediate belt is located between the infeed and the outfeed. A diverting module is located above the intermediate belt. This diverting module is based on a set of transversal rails mounted on a closed loop. A tool is fixed to a carrier sliding along each rail for engaging each product and bringing it to the desired transversal position. Here again, diverting can only be performed along the conveying movement, the infeed and the outfeed being aligned. Also, each transversal rail carries its own engine, leading to a costly device, requiring a lot of energy.

DE102007022910 describes a third principle for merely moving the products transversal to their conveying direction. This principle is based on a rotating star, equipped with radial pushers.

U.S. Pat. No. 4,484,289 describes a principle for bringing products, initially conveyed on a central conveyor, to continue on perpendicular conveyors, extending from a side of said central conveyor. The principle uses motorized rollers, rotating along an axis parallel to the central conveyor axis, and activated when the products is to be sent to the perpendicular conveyor. However, the cost and footprint of such a solution are not satisfying, especially because conveyors are needed to bring each product flow to such diverting surfaces.

JPS63165219 proposes a robotic means for moving groups of products from a first conveyor to a second conveyor. Batches of products are simultaneously transferred by said robotic means, and can also be rotated if necessary. This working principle has some drawbacks including the difficulty to adapt it easily in case of a new layout as well as the weight and corresponding inertia of a robotic means able to lift the products from one conveyor to the other.

The invention aims at improving said prior art, particularly by proposing a solution for directing products in a controlled way from an upstream portion to a downstream portion which has a limited footprint, cost, complexity, and/or a high adaptability to possible new requirements.

In order to reach this, the invention proposes a conveying junction based on a robotic means sweeping the products on a continuous flush surface from the infeed conveyor to an outfeed conveyor, without lifting said products.

According to the invention, there is provided a conveying device, for conveying products in an industrial processing line, said conveying device comprising, for circulating the products, at least one infeed conveyor, for receiving the products from a line portion upstream said device and a plurality of outfeed conveyors, for further delivering the products to a line portion downstream said device, said conveying device acting as a sorting device and directing product to a predefined outfeed conveyor.

This device is characterized in that the infeed conveyor and the plurality of outfeed conveyors extend in a common plane, the conveying device further comprising a robotic means, with a working area covering at least a portion of the at least one infeed conveyor and at least a portion of each outfeed conveyor, for moving products from said at least one infeed conveyor to a predefined outfeed conveyor of said plurality, with a movement parallel to said common plane.

There is also provided a corresponding method, which is a conveying process, comprising the steps of collecting products from an upstream portion on a belt based infeed conveyor, and delivering said products to a downstream portion on a predefined outfeed conveyor of a plurality, extending in the same plane than said infeed conveyor.

This conveying process is characterized in that it further comprises a transfer step executed by a robotic means and consisting in receiving the products on the infeed conveyor, sliding them in a horizontal plane and releasing them on the outfeed conveyor.

Further features and advantages of the present invention will be better understood from the description of preferred embodiments, which is given below by way of a non-limiting illustration, with reference to the accompanying drawings, in which.

A first object of the present invention is a conveying device 1, for conveying products 2 in an industrial processing line, said conveying device 1 comprising, for circulating the products 2, at least one infeed conveyor 3, for receiving the products 2 from a line portion upstream said device 1 and a plurality of outfeed conveyors 4, for further delivering the products 2 to a line portion downstream said device 1, said conveying device 1 acting as a sorting device and directing product 2 to a predefined outfeed conveyor 4.

Products 2 treated by this conveying device 1 are preferably parallelepiped boxes, or crates, comprising other elements, for example bottles, etc. The flow of products 2 is therefore lower than the flow of these elements. Also, the products 2 are of a larger bottom surface, which contributes to their stability when a horizontal force is applied.

Such a conveying device 1 aims, for example, at splitting or dividing a column flow of product 2, in which products 2 evolve one behind the other as a one product 2 wide column, in a plurality of such columns, evolving parallel to each other. These downstream columns of one product wide can be parallel or perpendicular to the upstream column they originate from. Such a conveying device 1 can also be used to move or shift the incoming products 3 column in a direction which is perpendicular to the column itself.

For reaching the outfeed conveyor 4, this conveying device 1 is able at least to move the products 2 of an incoming column, extending along a certain longitudinal direction 13, in a direction which is perpendicular to said longitudinal direction 13, the downstream subsequent conveying being perpendicular or parallel to said longitudinal direction 13.

According to the invention, the infeed conveyor 3 and the plurality of outfeed conveyors 4 extend in a common plane, the conveying device 1 further comprising a robotic means 7, with a working area 15 covering at least a portion of the at least one infeed conveyor 3 and at least a portion of each outfeed conveyor 4, for moving products 2 from said at least one infeed conveyor 3 to a predefined outfeed conveyor 4 of said plurality, with a movement parallel to said common plane, so that the products 2 are moved by the robotic means 7 along said common plane, with a movement parallel to it.

In some embodiments of the conveying device 1, it further comprises, in the working area 15 of the robotic means 7, a central plate 5, defining a top fixed surface, mounted downstream said at least one infeed conveyor 3 and upstream said at least one outfeed conveyor 4, said central plate 5 being flush with the at least one infeed conveyor 3 and the outfeed conveyors 4, the robotic means 7 moving the products 2 onto said central plate 5 from the at least one infeed conveyor 3 and to the predefined outfeed conveyor 4.

The infeed conveyor 3 of said conveying device 1 extends along the longitudinal direction 13. This infeed conveyor 3 brings products 2 from the machine or portion upstream to the conveying device 1 in the industrial line. The outfeed conveyor 4 delivers products 2 to the machine or portion downstream to the conveying device 1 in the industrial line. The movement of products 2 in a direction which is perpendicular to the longitudinal direction 13 of the infeed conveyor 3 takes place between the infeed conveyor 3 and the outfeed conveyor 4, for example on the central plate 5.

In some embodiments, the products 2 displacement, perpendicular to the longitudinal direction 13, can take place between the infeed conveyor 3 and the outfeed conveyor 4, said infeed conveyor 3 and said outfeed conveyor 4 being however aligned in the longitudinal direction 13. This means that the product 2 can be moved back and forth along a direction which is perpendicular to the longitudinal direction 13, for example to process the product 2 between the infeed conveyor 3 and the outfeed conveyor 4.

In some embodiments, the conveying device 1 has a plurality of infeed conveyors 3, which can be parallel to each other or not. Also, the outfeed conveyors 4 can be parallel to each other or not.

The conveying device 1 is installed in an industrial processing line, in which products 2 are processed one after the other in subsequent processing machines or zones. In this industrial line, the conveying device 1 is installed after an upstream machine or portion comprising a plurality of machines, and before a downstream machine or portion comprising a plurality of machines. This conveying device 1 transfers the products 2 from the upstream portion or machine to the downstream portion or machine.

This conveying device 1 works as a sorting device, able to receive a product 2 while it is still on the infeed conveyor 3 and to deliver it on a specific outfeed conveyor 4 for further movement. In other words, said conveying device 1 is able to direct and bring each product 2 to the outfeed conveyor 4 which corresponds to the specific processing it is to go through. The conveying device 1 can work as a diverter to direct the flow of products 2 to a certain specific outfeed conveyor 4. This conveying device 1 is able to achieve this treatment for each product 2 separately.

Preferably, said at least one infeed conveyor 3 is of the closed belt type, meaning that it comprises a moving belt, on which products 2 stand. Therefore, the top surface of this belt, on which the products 2 stay, is moved in order to circulate the products 2. An outfeed conveyor 4 can also be such a motorized belt, but could also be a simple low friction surface, for example an idle roller or ball based surface.

In some embodiments, the same closed belt forms both the infeed conveyor 3 and the outfeed conveyor 4.

Preferably, the top surface of central plate 5 is fixed. Therefore, when products 2 arrive on this central plate 5, they are not driven anymore by the surface they stand on.

Infeed and outfeed conveyor 3, 4 are in the same plane, and it is therefore possible for the robotic means 7 to bring a product 2 from the infeed conveyor 3 to the outfeed conveyor 4 with a movement parallel to this plane. As they form a flush surface, with no significant separation gap compared to the size of the products 2, the robotic means 7 simply pushes or pulls the product 2 along this surface, without separating them from this support surface.

The working area 15 of the robotic means 7 is defined by the portion of the conveyors 3, 4, plane which the operating free end of the robotic means 7 can reach. The robotic means 7 and the conveyors 3, 4 are fixed so that the robotic means 7 can access each conveyor. In some embodiments, the downstream end of the infeed conveyor 3 and/or the upstream end of the outfeed conveyor 4 are/is in this working area 15.

When the conveying device 1 comprises a central plate 5 between the infeed conveyor 3 and the outfeed conveyor 4, on which products 2 are circulated and swept from the infeed conveyor 3 to the outfeed conveyor 4, the central plate 5 is also flush with said conveyors, with a limited or no gap between them. The central plate 5 is in the working area 15, so that the robotic means 7 can move products 2 thereon.

Hence, the robotic means 7 can catch products 2 which are still on the infeed conveyor 3, and release them on the outfeed conveyor 4, and, when applicable, after having moved them on a central plate 5 in between.

The top surface of the at least one infeed conveyor 3, and of the at least one outfeed conveyor 4, on which products 2 stay with normally no relative movement, are coplanar to the top surface of the central plate 5, which is fixed. In a normal process when the products 2 are flowing, there is no relative movement between the products 2 and the top surface of the infeed conveyor 3 and the top surface of the outfeed conveyor 4, but there is a relative movement between the products 2 and the top surface of the central plate 5.

There is no offset, on the hand, between the at least one infeed conveyor 3 and the central plate 5, and, on the other hand, between the at least one outfeed conveyor 4 and the central plate 5, these three surfaces being flush, for allowing an easy horizontal product 2 sweep, and, therefore, the use of a low power robotic means 7.

In corresponding embodiments, the robotic means 7 first takes products 2 from the infeed conveyor 3 and bring them on the central plate 5, and then takes them from the central plate 5 and bring them on the outfeed conveyor 4. There is no product 2 accumulation on the central plate 5 itself, meaning that the robotic means 7 removes the product 2 from the central plate 5 before bringing a new one. There is only one product 2 at a time which is transferred by the robotic means 7 through the central plate 5.

The robotic means 7 normally remains in contact with the product 2 during its transfer from the infeed conveyor 3 to the outfeed conveyor 4.

Both the at least one infeed conveyor 3 and the at least one outfeed conveyor 4 abuts the central plate 5, either at one of their longitudinal ends or at one of their lateral sides, so that products 2 can easily be shifted from or to the central plate 5. The transfer movement is essentially horizontal, the infeed conveyor 3, the central plate 5 and the outfeed conveyor 4 being at the same height. The product 2, when moved by the robotic means 7, still touches a horizontal support on which it slips: infeed conveyor 3, central plate 5, when existing, then outfeed conveyor 4. Therefore, the robotic means 7 only acts on the product 2 with a force which is parallel to the conveyors and the central plate 5, which are all coplanar.

The robotic means 7 has a tool for directly interacting with the products 2, said tool being located at the free end of a movable controlled manipulator.

It goes without saying that this conveying device 1 can have more than one such tool, operating simultaneously in the working area 15. The incoming products 2 would then be treated by one of said tools, then the next one treated by another tool, etc. Also, such a tool can be able to treat more than one product 2 at a time, as a batch. In such embodiments, the batch would be displaced as a whole, and the products 2 of said batch would not be moved relative to each other.

According to an additional possible feature, at least one of the outfeed conveyors 4 comprises an endless belt defining a top moving surface on which products 2 are received, and preferably each outfeed conveyor 4. In some embodiments, at least one and preferably each outfeed conveyors 4 is not motorized.

According to an additional possible feature, the top surface of the central plate 5 is of a reduced friction, compared to the infeed conveyor 3 and/or the outfeed conveyor 4, for example with the help of an air bed or of rolling means like rollers or balls. As already said, there should be no movement of the product 2 on the belt of the infeed 3 and/or outfeed 4 conveyor. Also, as the products 2 are to be driven on the fixed top surface of the central plate 5, the movement of the product 2 on the central plate should require as less energy as possible. These conveyor are therefore of a higher friction to the products 2 than the central plate 5.

Different solutions can be implemented to bring the friction of the central plate 5 to the lowest possible value, for example by using freely rolling surfaces, or air cushion, etc. The low friction is preferably for any movement direction.

On the central plate 5, the products 2 are driven by the robotic means 7, with an interaction with a vertical side of said products 2, rather than with the bottom.

In some embodiments, the conveying device 1 further comprises a gantry 6 on which the robotic means 7 is fixed above its working area 15. Preferably, a tool for direct interaction with the products 2 is mounted at the free end of a manipulator of the robotic means 7. The manipulator can move the tool in a certain horizontal working area 15, and therefore pick, transfer and release products 2 inside this working area 15. The tool is moved slightly above the coplanar conveyors and central plate 5, for sweeping the products 2. It grasps products 2 as they are on the infeed conveyor 4, transfer them on the central plate 5 when existing, and release them on the outfeed conveyor 4. This means that the robotic means 7 is in charge of transferring the products 2 from the infeed conveyor 3 to the central plate 5, and from the central plate 5 to the outfeed conveyor 4. The working area 15 of the tool therefore extends both on the at least one infeed conveyor 3 and the at least one outfeed conveyor 4.

The conveying device 1 has a loading zone, in which the infeed conveyor 3 circulates, to be able to bring the products 2 for them to be taken by the robotic means 7 in said loading zone. The conveying device 1 also has an unloading zone, in which the outfeed conveyor 4 circulates, to be able to move the products 2 to the downstream portion. The working area 15 covers at least a portion of the loading zone, of the central plate 5, and of the unloading zone.

The infeed conveyor 3 can extend or not downstream to the loading zone. Also, the outfeed conveyor 4 can extend or not upstream to the unloading zone.

The gantry 6 receives the fixed end of the manipulator. It can be located directly above the central plate, with the robotic means 7 hanging underneath. In some other embodiments, it can be located aside the central plate 5, with the robotic means 7 mounted in a cantilever fashion.

According to another additional possible feature, the conveying device 1 comprises at least two infeed conveyors 3, one of the outfeed conveyors 4 feeding one of said infeed conveyors 3, thereby forming an accumulation portion 8 of the first-in-first-out type, the outfeed conveyor 4 and the infeed conveyor 3 being potentially the same belt, extending from and to the central plate 5. Products 2 brought by the robotic means 7 to this accumulation portion 8 are therefore recirculated back to the working area 15. It goes without saying that this accumulation portion 8 can be based on a single belt: the upstream portion of said belt would form an infeed conveyor 3, and the downstream portion of said belt would form an outfeed conveyor 4.

According to another possible additional feature, at least one of the outfeed conveyors 4 is controllable for moving products 2 either from or to the working area 15, thereby forming an accumulation portion 8 of the first-in-last-out type. This means that the same conveyor can be used either as an infeed conveyor 3, which normally brings products 2 to the working area, for example directly on the central plate 5, or as an outfeed conveyor 4, which normally drives products 2 away from it. Preferably, such a conveyor is a belt based reversible conveyor. The driving motor can for example be rotated in both directions.

According to another possible additional feature, the at least one infeed conveyor 3 is upstream and aligned to at least one outfeed conveyor 4, the two being in abutment or separated by the central plate 5. This would mean that the infeed conveyor 3 extends to the central plate 5 and reaches it at the level of its downstream end 10. The products 2 circulating on the infeed conveyor 3 therefore leave said infeed conveyor 3 to be transferred to the central plate 5 when they reach the downstream end of the infeed conveyor 3. Also, for the outfeed conveyor 4, this would mean that it extends from the central plate 5 at the level of its upstream end 9. The products 2 would then circulate from the central plate 5 directly to the upstream end 9 of the outfeed conveyor 4.

Therefore, in some configurations, the central plate 5 is located directly between the upstream end 9 of the outfeed conveyor 4 and the downstream end 10 of the infeed conveyor 3. The infeed conveyor 3 abuts the central plate 5 at its own upstream zone, and the outfeed conveyor 4 abuts the central plate 5 at its own downstream zone.

The end of infeed 3 or outfeed 4 conveyor has a linear edge, perpendicular to the conveyor direction itself. According to this feature, this linear edge would arrive against the linear perimeter of the central plate 5 or another such conveyor end. Products 2 would then be transferred to or from the central plate 5 with a movement which is parallel to the conveying direction itself of either the infeed conveyor 3 or the outfeed conveyor 4.

According to another possible additional feature, at least one outfeed conveyor 4 extends laterally from the infeed conveyor 3, directly from the side of the infeed conveyor 3 or separated by the central plate 5. For example, the outfeed conveyor 4 can be parallel or perpendicular to the infeed conveyor 3. The infeed conveyor 3 and the outfeed conveyor 4 can be separated by a central plate 5: the side of the conveyor, either infeed 3 or outfeed 4, would then extend along an edge of the central plate 5 itself, said central plate 5 being located aside the infeed conveyor 3 and/or the outfeed conveyor 4. Transferring the products 2 from or to the conveyor, either infeed 3 or outfeed 4, would then be achieved with a movement perpendicular to the conveying direction.

It is clear that these layouts can be combined, for example with an infeed conveyor 3 reaching the central plate 5 by its end, while the outfeed conveyor 4 circulates aside the central plate 5.

According to these possible layouts, adding or removing an infeed conveyor 3 or an outfeed conveyor 4 is very simple, as long as the perimeter of the central plate 5 still has some free space to receive either the end of the conveyor or its side.

The frontier between the infeed conveyor 3 and either the central plate 5 or the outfeed conveyor 4, as well as, when applicable, the frontier between the central plate 5 and the outfeed conveyor 4, can be either along the longitudinal direction 13 or perpendicular.

In some preferred embodiments, the conveying device 1 comprises a control unit 11 instructing the robotic means 7 for bringing the products 2 received from the at least one infeed conveyor 3 to one defined outfeed conveyor 4 of said plurality. The control unit 11 possibly also controls the outfeed conveyor 4 and/or the infeed conveyor 3. The outfeed conveyor 4 to which the product 2 is brought can change and be specifically defined for each product 2. The product 2 received can for example firstly be identified, based on a label, RFID tag, or any sort of testing, the control unit 11 further deciding the relevant outfeed conveyor 4 based on the result of this first phase.

According to another possible additional feature, the conveying device 1 comprises a plurality of infeed conveyors 3, a or the control unit 11 of the conveying device 1 instructing the robotic means 7 for taking the products 2 from one defined infeed conveyor 3 of said plurality to bring it to the at least one outfeed conveyor 4. In such embodiments, it is possible to create an output flow of products 2 on one single outfeed conveyor 4, which would be a sequence of completely different products 2, each kind of product 2 coming from one of the infeed conveyors 3. The use of a controlled robotic means 7 makes it possible to have a completely controllable sequence of products 2 on the outfeed conveyor 4, rather than repeating a single mixing scheme.

Of course, the conveying device 1 can have a plurality of infeed conveyors 3, and a plurality of outfeed conveyors 4, the control unit 11 controlling the robotic means 7 so that it acts from above on the products 2 to transfer them from a predefined infeed conveyor 3 to a predefined outfeed conveyor 4. Defining the infeed conveyor 3 at which the product 2 must be taken, and defining the outfeed conveyor 4 to which the product 2 must be brought, can be based on the specificity of the product 2 itself, or another overall flow control rationale.

In some embodiments, the conveying device 1 further comprises, in the working area 15, an intermediate station 12 to which the robotic means 7 temporarily brings the products 2 for processing, between their picking at the infeed conveyor 3 and their delivery at the outfeed conveyor 4, said intermediate station 12 being for example located in the area of the central plate 5. This processing can transform the product 2, for example adding a label, closing the flaps of the boxes, adding a special element inside the product 2, etc., test the product 2 for quality control, or simply extract information from said product 2, like size, weight, identification, etc. This intermediate station 12 is preferably operatively connected to the control unit 11, sending information to said control unit 11 for further calculation, and/or receiving instruction from said control unit 11.

The intermediate station 12, just like the at least one infeed conveyor 3 and the at least one outfeed conveyor 4, normally stand at the periphery of the central plate 5. Products 2 can then be circulated by the robotic means 7 on the central plate 5 and transferred to or from conveyors 3, 4, stations 12, or other functions by moving them through the edge of said central plate 5.

The above described conveying device 1 is to be integrated in an industrial packaging line, treating stable products 2 like boxes or cartons. Said industrial line has such a conveying device 1, mounted between an upstream portion and a downstream portion. The upstream portion comprises at least one product 2 processing machine. The downstream portion also comprises at least one product 2 processing machine. The conveying device 1 is mounted so that it receives products 2 from the upstream portion at the level of its at least one infeed conveyor 3, and supplies products 2 to the downstream portion at the level of its outfeed conveyors 4.

On the or each infeed conveyor 3, products 2 are circulated as a one product 2 wide column. Also, on the or each outfeed conveyor 4, products 2 are circulated as a one product 2 wide column.

In some embodiments, the control unit 11 is connected to the upstream portion of the industrial line and/or the downstream portion of it, in order to exchange information, particularly information taken into account to control the robotic means 7 and selecting the specific infeed conveyor 3 and/or the specific outfeed conveyor 4 it has to reach for transferring the products 2 to or from the central plate 5.

A second object of the present invention is a working process for the above mentioned device, which means a conveying process, comprising the steps of collecting products 2 from an upstream portion on a belt based infeed conveyor 3, and delivering said products 2 to a downstream portion on a predefined outfeed conveyor 4 of a plurality, extending in the same plane than said infeed conveyor 3.

According to the invention, the process further comprises a transfer step executed by a robotic means 7 and consisting in receiving the products 2 on the infeed conveyor 3, sliding them in a horizontal plane and releasing them on the outfeed conveyor 4. Sliding the product 2 from the infeed conveyor 3 to the outfeed conveyor 4 can be done by sweeping the products 2 onto a central plate 5, in abutment between the infeed conveyor 3 and the outfeed conveyor 4.

As already said the products 2 keep touching the conveyors and even the central plate 5 while they are transferred from the infeed conveyor 3 to the outfeed conveyor 4. They work as a support, and the robotic means 7 does not have to compensate the weight of the products 2.

In order to guarantee the possibility to exploit the full perimeter of the central plate 5, thereby contributing to the adaptability of the conveying device 1, the working area 15 of the robotic means 7 covers the entire perimeter of the central plate 5. In order to reach this, the robotic means 7 preferably consists in a set of arms fully rotatable to each other, or also in a picking robot, like the one disclosed for example in U.S. Pat. No. 4,976,582 or even EP2799190.

The transfer step executed by the robotic means 7 is based on pushing forces, parallel to the support on which products 2 are. Lifting the products 2 is not necessary.

According to a possible additional feature, the products 2 are rotated to the vertical axis, during the transfer from the infeed conveyor 3 to the outfeed conveyor 4, this rotation taking place for example on the central plate 5 itself. This means that the robotic means 7 has a means for rotating the tool mounted at its free end.

In some possible configurations, the outfeed conveyors 4 extend perpendicular to the infeed conveyor 3. In such configurations, simply laterally bringing the products 2 to the outfeed conveyor 4 leads to an output column in which products 2 are perpendicular compared to their position in the input column. Rotating the product 2 during the transfer makes it possible to have the same product 2 configuration in the input column than in the output column. Also, if the outfeed conveyor 4 directly brings products 2 for a subsequent palettisation step, rotating the product 2 before bringing it on the outfeed conveyor 4 helps in creating the palettisation scheme right after the working area 15.

According to another possible feature, the process further comprises a recirculating step, during which products 2 released are brought back to the robotic means 7 after having circulated on an accumulation portion 8. As already explained, this recirculation can be of the first-in-first-out fashion, or of the first-in-last-out fashion. It should be noted that both the entrance and exit of this accumulation portion 8 is at the level of the central plate 5. This allows for example to accumulate products 2 to be later treated in an intermediate station 12.

In some embodiments, the products 2 received from the upstream portion are stopped prior to being manipulated by the robotic means 7. This can be achieved by stopping the infeed conveyor 3, proper regulation of the conveyor 3 speed, slowing it down in an anticipated way, or even by merely inserting a retractable stop downstream the first product 2. This helps for example in avoiding downstream products 2 to be introduced on the central plate 5 by the pressure of the upstream products 2, driven by the infeed conveyor 3.

According to another possible additional feature, the process further comprises a distribution calculation step, executed by a control unit 11 piloting the robotic means 7, during which one specific conveyor is selected out of a plurality of infeed conveyors 3 for taking a product 2 therefrom with said robotic means 7, and/or one specific conveyor is selected out of a plurality of outfeed conveyors 4 for delivering a product 2 thereto with said robotic means 7.

Figure 1:
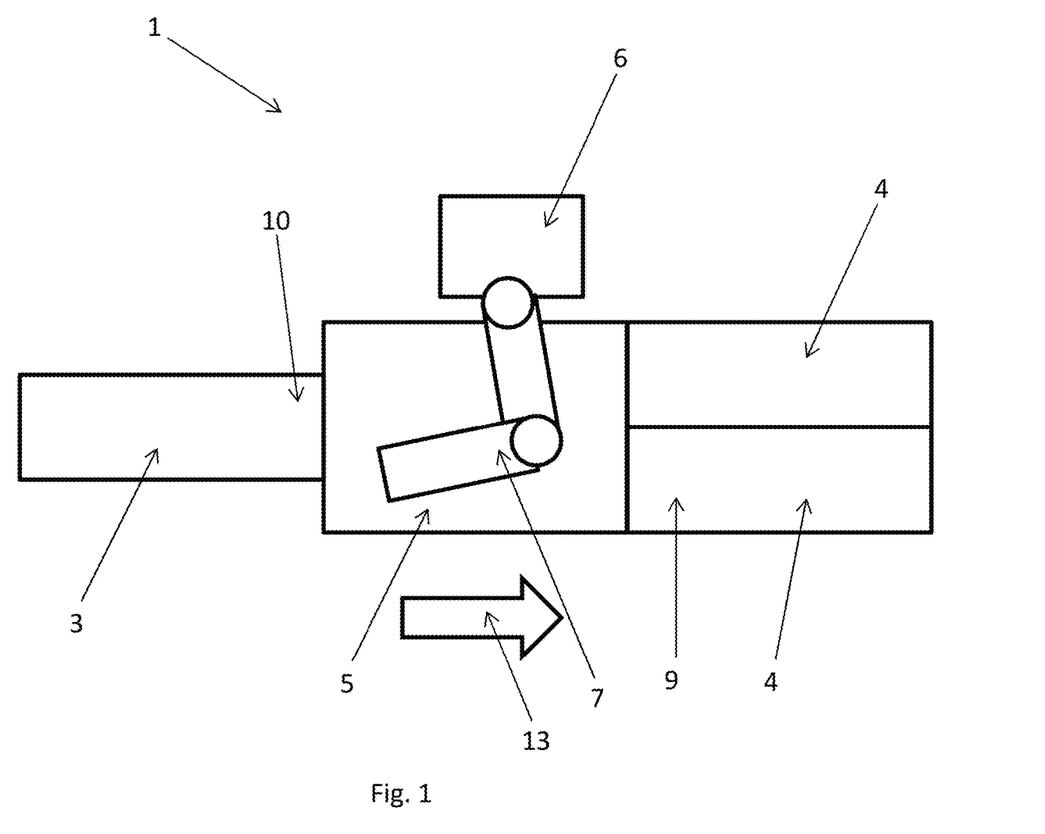
FIG. 1 is a top view of possible embodiment, products flowing from the left to the right.
Figure 2:
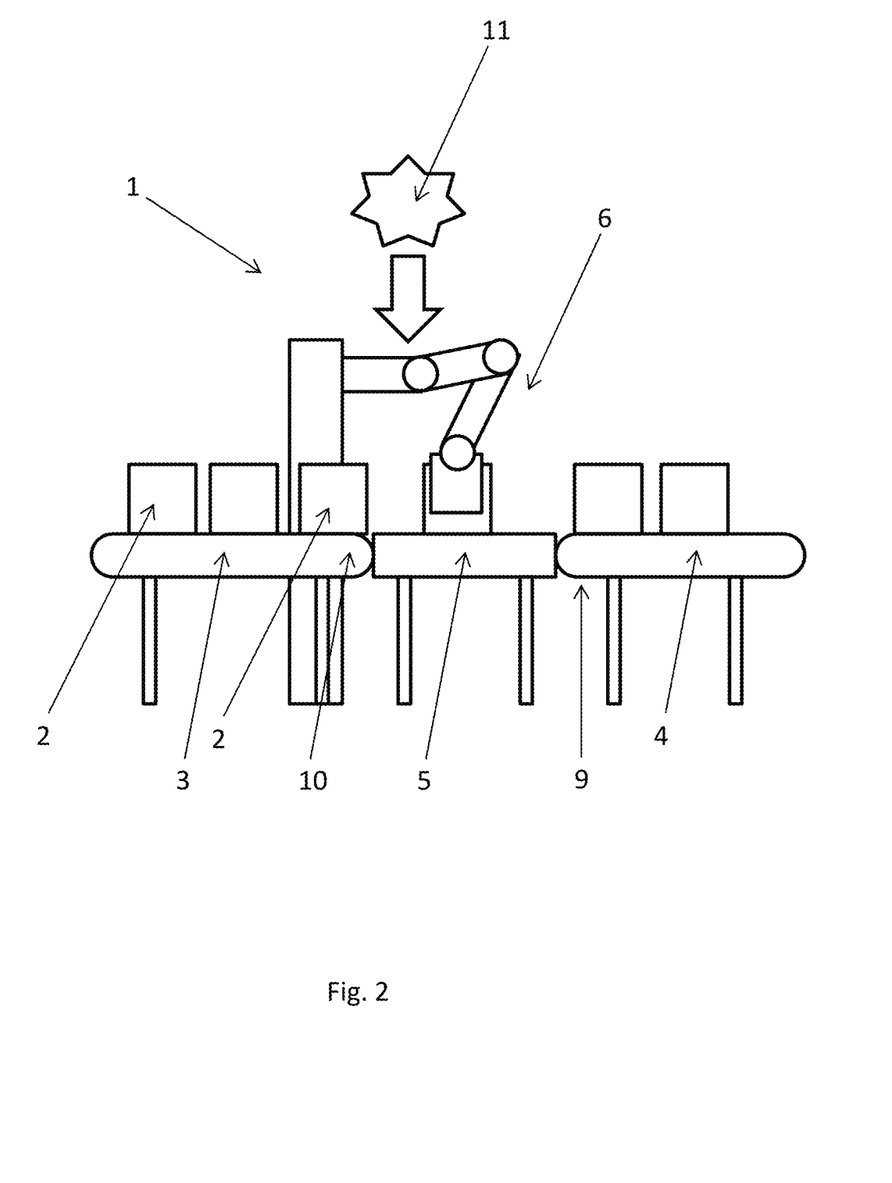
FIG. 2 is a side view of a possible embodiment, products flowing from the left to the right.
Figure 5:
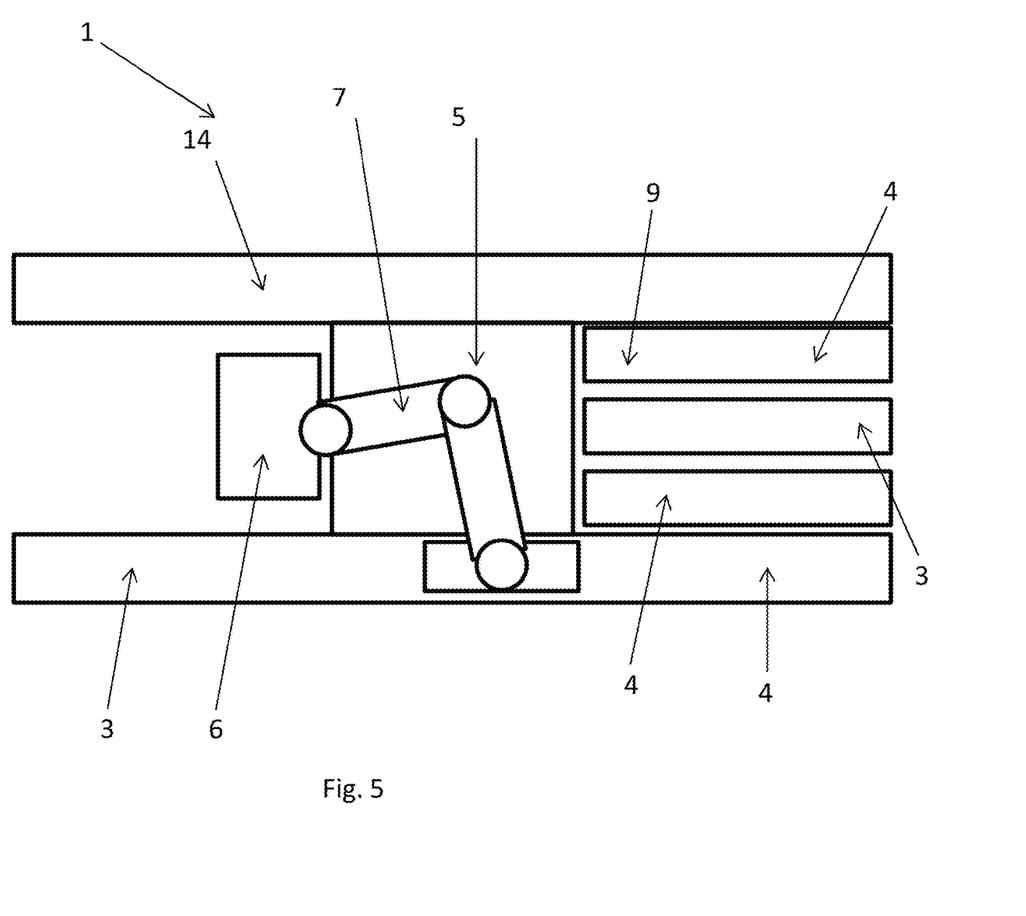
FIG. 5 shows a special layout, with some conveyor ending at the central plate, and some other moving aside it, products flowing from the left to the right
Figure 6:
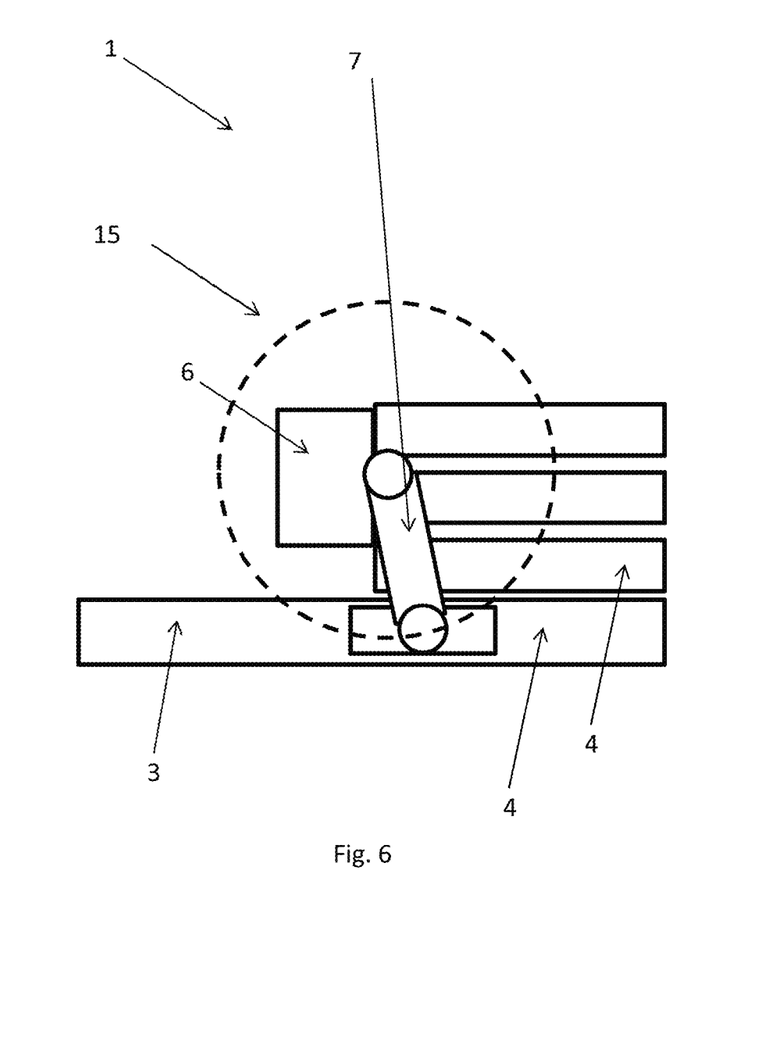
FIG. 6 shows an embodiment with no central plate.

In the embodiment shown in FIG. 1, the conveying device 1 has one infeed conveyor 3. In FIG. 5, the conveying device 1 has two infeed conveyors 3. In FIG. 6, the embodiment has no central plate 5.

The conveying device 1 receives products 2 arranged as a column on the infeed conveyor 3 or on each infeed conveyor 3. Products 2 are circulated as a column by the at least one infeed conveyor 3. They can touch each other, thereby creating a compact column, or be separated by a gap. The conveying device 1 is installed between an upstream and a downstream portion of the line, both comprising at least one product 2 processing machine. A product processing machine can be a labeler, a palletizer, a weighing means, etc.

In preferred embodiments, both the upstream and the downstream portion comprise a plurality of machines. Each upstream machine delivers products 2 on a certain specific conveyor, and each downstream machine receives products 2 from a certain specific conveyor. The conveying device 1 forms a junction and acts between said upstream portion and said downstream portion as a means for directing products 2, coming from different upstream conveyors or infeed conveyors 3, to the right downstream conveyor or outfeed conveyor 4.

The conveying device 1 receives products 2 from the upstream portion with its at least one infeed conveyor 3 and delivers products 2 to the downstream portion with it's at least one outfeed conveyor 4. The conveying device 1 has a controlled handling tool, or robotic means 7, for taking products 2 arriving on infeed conveyors 3 and bringing them to outfeed conveyors 4. Preferably, the robotic means 7 is controlled by a control unit 11, instructing it to pick at least one product 2 to a predefined infeed conveyor 3 within the plurality of infeed conveyors 3, and to deliver it to a predefined outfeed conveyor 4 within the plurality of outfeed conveyors 4. Infeed conveyors 3 and outfeed conveyors 4 are flush, so that the robotic means 7 can simply push and slide each product 2 to the outfeed conveyor 4.

In preferred embodiments, the industrial line, in which the conveying device 1 is installed, is a packaging line and the conveying device 1 treats products 2 which are packs or boxes, full of single elements like containers, bottles, flasks, pouches, etc. As the conveying device 1 only deals with products 2 comprising a plurality of such elements, it is clear that its processing rate, in terms of products 2 treated in one minute for example, can be lower than the processing rate of upstream machines which directly process each single element.

It should be noted here that the conveying device 1 can have many different infeed conveyors 3, and each infeed conveyor 3 can circulate a specific sort of product 2. For example, the dimensions, content, and/or weight of products 2 circulated by one infeed conveyor 3 can be different than those of products 2 circulated by another infeed conveyor 3, and the robotic means is controlled accordingly.

The conveying device 1 has a plurality of infeed conveyors 3 and/or a plurality of outfeed conveyors 4. The robotic means 7 is controlled for receiving products 2 from the infeed conveyor 3 or a predefined infeed conveyor 3 from the plurality of infeed conveyors 3, and further bringing them to the outfeed conveyor 4 or a predefined outfeed conveyor 4 from the plurality of outfeed conveyors 4.

The at least one infeed conveyor 3 uses an endless belt. Also, the at least one outfeed conveyor 4 preferably uses an endless belt. These belts are moving and the products 2, laying on the top surface of said belts, are driven by said movement.

In order to easily receive products 2 from and bring them to conveyors, the conveying device 1 can be equipped with a central plate 5. This central plate 5 works as a fixed junction to which products 2 can be delivered by the infeed conveyor 3 or conveyors and from which products 2 can be fed to the outfeed conveyor 4 or conveyors. In order to achieve the numerous possible connections and corresponding trajectories from one infeed conveyor 3 to one outfeed conveyor 4, the products 2 are moved on this central plate 5 by a robotic means 7. Having a robotic means 7 working on a flush surface, makes it possible to easily change the connection of the conveying device 1 with the upstream and downstream portion.

Adding an upstream connection can be achieved by simply bringing the downstream end of an additional infeed conveyor 3 to such a central plate 5. Also, adding a downstream connection can be achieved by simply bringing to the central plate 5 the upstream end of an additional outfeed conveyor 4.

As already said, the endless belt of both the infeed conveyor 3 and the outfeed conveyor 4 is moved, thereby circulating the products 2 to or from the central plate 5. On the other hand, the top surface of the central plate 5 is fixed. Therefore, the movement of the products 2 on the central plate 5 does not result from a displacement of top surface of the central plate 5. In fact, the movement of products 2 from an infeed conveyor 3 to an outfeed conveyor 4 is obtained by the robotic means 7. Using such a robotic means 7 helps in reaching a high level of flexibility of the conveying device 1, because it makes it possible to easily connect any infeed conveyor 3, wherever it arrives in the working area 15, to any outfeed conveyor 4, wherever it starts from the working area 15.

The central plate 5 is preferably of a rectangular shape. The conveyors, both infeed 3 and outfeed 4, have a longitudinal direction 13, along which they move, and a transversal direction, perpendicular to said longitudinal direction in the conveying plane. A conveyor, either infeed conveyor 3 or outfeed conveyor 4, is against another conveyor or against the rectangular shape of the central plate 5 with two possible geometric configurations. The first possible configuration corresponds to the end of the conveyor, with a transversal direction, against the central plate 5 or the other conveyor. The second configuration corresponds to one side of the conveyor, with a longitudinal direction, against the central plate 5 or the other conveyor. FIG. 5 shows simultaneously both configurations. FIG. 6 shows conveyors aside each other with no central plate 5.

Hence, when bringing a product 2 from an infeed conveyor 3 to an outfeed conveyor 4, the robotic means 7 moves the products 2 from one portion of the periphery of the central plate 5 to another.

The robotic means 7 is preferably based on articulated arms, illustrated in FIG. 5. The robotic means 7 is preferably fixed to a support or gantry 6, and a tool is mounted at its free end. This tool is adapted to cooperate with at least one product 2. The mobility of the robotic means 7 makes it possible for the tool to circulate in the working area 15 on the central plate 5 and reach both any infeed conveyor 3 and any outfeed conveyor 4, to make it possible for the robotic means 7 to take products 2 from an infeed conveyor 3 and to deliver products on an outfeed conveyor 4.

The at least one infeed conveyor 3, the at least one outfeed conveyor 4 and the central plate 5 are preferably coplanar: no vertical displacement is therefore necessary to move the products 2 between the infeed 3 and the outfeed 4 conveyors. Therefore, the robotic means 7 only has a horizontal action on the products 2. The robotic means 7 has a sweep action to push products 2 from the predefined infeed conveyor 3 to the predefined outfeed conveyor 4 with a mere horizontal force. Also, the possible additional central plate 5 provides a horizontal support so that the robotic means 7 does not need to compensate for the weight of the products 2. The robotic means 7 can therefore be light and fast. Also, the robotic means 7 does not lift products 2 from the infeed conveyor 3 to the outfeed conveyor 4. This makes it possible to use such a conveying device 1 for products 2 which should not be lifted, for example because they are completely closed, or because they are too heavy. Also, this makes it possible to treat a plurality of independent products 2 at each cycle.

In order to further reduce the required capability of the robotic means 7, the central plate 5 is of a reduced friction, especially compared to the friction of the infeed 3 and outfeed 4 conveyors. The friction of said conveyors must be high enough to drive the products 7 when their belt is moved. On the other hand, the horizontal friction force opposed by the central plate 5 must be as low as possible. The horizontal displacement of the products 7 on the horizontal central plate 5 is therefore very easily obtained, and a robotic means 7 of a reduced capability can be used.

For obtaining such a reduced friction force, the central plate 5 can use, for example, a contact surface made of a plurality of contact balls, free to rotate along each axis. Another solution can be to create an air bed between the products 7 and the top surface of the central plate 5. This can be obtained with a central plate 5 with a plurality of holes through which air flows from beneath said plate.

The robotic means 7 creates a planar displacement of the products 2 on the central plate 5. The robotic means 7 can also be able to rotate the products 2 while they are pushed to the outfeed conveyors 4. This means that the orientation of the product 2, compared to the longitudinal direction, is not the same on the infeed conveyor 3 and on the outfeed conveyor 4. Turning the products 2 can be achieved for each product 2 independently. Alternately, products 2 can be rotated as a batch: the relative position of products 2 remains the same in the batch, and the whole batch is rotated.

Figure 3:
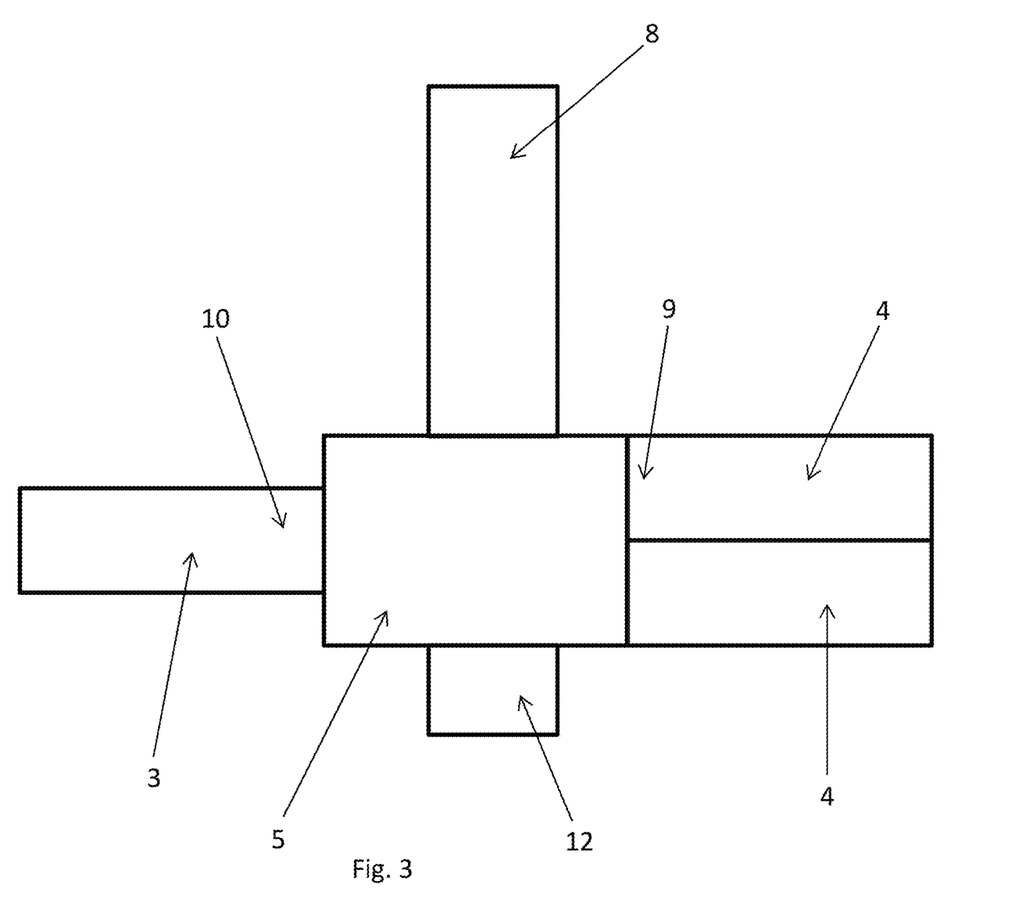
FIGS. 3 and 4 each shows a layout with no robotic means, products flowing from the left to the right.
Figure 4:
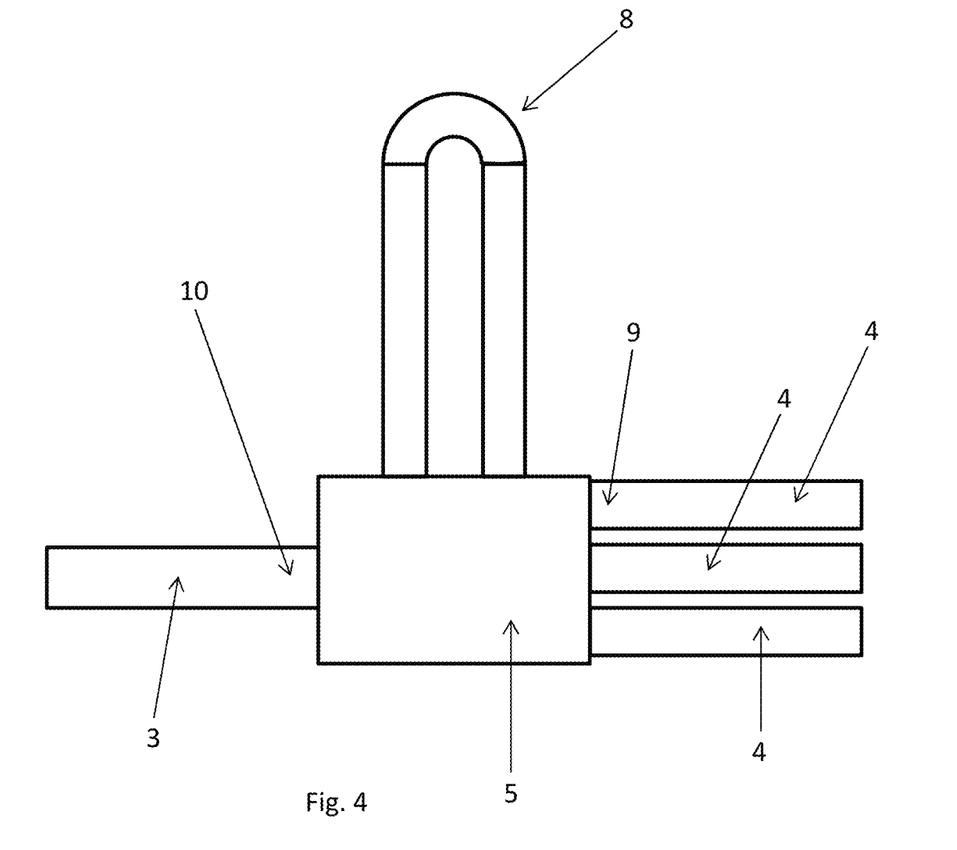

FIGS. 3 and 4 show the possibility to organize an accumulation portion 8 from and to the working area 15, cooperating with the central plate 5. Two configurations are possible.

In the first configuration, one single conveyor means works as both an outfeed conveyor 4 and an infeed conveyor 3. This conveyor means is arranged as a closed loop and can both receive products 2 from the central plate 5 or working zone 15 and, after having circulated them on said closed loop, deliver products 2 back to the central plate 5 or working zone 15. Products 2 are therefore first brought on an outfeed conveyor 4 by the robotic means 7. The closed loop then brings products 2 from said outfeed conveyor 4 back to an infeed conveyor 3. Products 2 are then ready to be picked again by the robotic means 7. Such an accumulation portion 8 works as a first in first out accumulation. The closed loop can be of an adjustable length.

In the second configuration, one single conveyor means can be controlled to move products 2 along two opposed directions: either to move products 2 away from the central plate 5 or working zone 15, or to bring products 2 to it. This single conveyor means therefore also works as either an infeed conveyor 3 or an outfeed conveyor 4. When products 2 need to be accumulated, this single conveyor means is driven as an outfeed conveyor 4, thereby moving products 2 away from the central plate. When product 2 have to be brought back, the conveyor means is driven in the opposite direction, so that products 2 arrive again near the central plate 5 or working area 15 and can then be taken by the robotic means 7. This accumulation portion 8 works with a first in last out principle.

As already mentioned earlier, the robotic means 7 can treat and distribute products 2 one by one, which is especially needed when each product 2 is to be delivered to a different outfeed conveyor 4. In some other embodiments, the robotic means 7 treats a batch of products 2 simultaneously. The handling tool at the end of said robotic means 7 is able to cooperate and push more than one product 2 simultaneously. The products 2 treated by the robotic means 7 as a batch are aligned on the infeed conveyor 3 along either the longitudinal or the transversal direction thereof. It is also evident that the robotic means 7 can treat a different number of products 2 at each cycle, for example distribute one product 2, then distribute two products 2, then again one, etc.

This principle, with or without a low friction central plate 5, allows for a simple robotic based distribution of products 2 from the at least one infeed conveyor 3 to the at least one outfeed conveyor 4, which moves products 2 in the working area 15.

When applicable, products 2 are moved by the robotic means 7 between portions of the periphery of the central plate 5 at the level of which said products 2 can shift between a central plate 5 support to an infeed 3 or outfeed 4 conveyor support. During their movement on the central plate 5 from an infeed conveyor 3 to an outfeed conveyor 4, products 2 can be brought by the robotic means 7 for a processing step prior to be released on the outfeed conveyor 4. For example, a product 2 processing machine can be mounted at the perimeter of the central plate 5. Such a processing machine can test the product 2, identify the product 2 for deciding the corresponding outfeed conveyor 4 or other tracking purposes, but also, for example, close the product 2, stick a label to it, etc. If the processing performed is long lasting, the robotic means 7 can continue the distribution while the processing is ongoing, and treat the processed products 2 later on.

FIG. 5 shows a possible configuration in which a same continuous conveyor means works as both infeed conveyor 3 and outfeed conveyor 4. In fact, this single continuous conveyor means forms a main conveyor 14 between an upstream portion in the line and a downstream portion in the line. When necessary, the robotic means 7 takes products 2 away from this main conveyor 14, working as an infeed conveyor 3, and brings them to the side outfeed conveyor 4, possible through the central plate 5. These products 2 are later brought back to the main conveyor 14, working as an outfeed conveyor 3. With such a configuration, the conveying device I can have one infeed conveyor 3 and one outfeed conveyor 4: products 2 have the same orientation on the former and different orientation and/or transversal position on the latter.

It should also be noted that the conveying device 1 can comprise a means for stopping the flow of incoming products 2 arriving in the working area 15 or even arriving on the central plate 5. Stopping the product 2 incoming flow or flows can be necessary when the robotic means 7 is not immediately able to treat the delivered product 2. This can be achieved by inserting a stop before the very first downstream product 2. Such a simple controllable abutment element can later be retracted to let the products 2 move. Another possibility is to control the speed of the infeed conveyor 3. The infeed conveyor 3 is therefore stopped when the downstream product 2 is detected as being too close to the central plate 5.

In some embodiments, the conveying device 1 comprises product detectors able to detect the presence of product 2 conveyed by the at least one infeed conveyor 3, when they arrive near the perimeter of the central plate 5. They are connected to the control unit 11 which then controls the movement of the product 2, by controlling the speed of the at least one infeed conveyor 3 and/or the position of a retractable stop. The control unit 11 preferably controls both the flow of incoming products 2 and the movement of the robotic means 7. It can also control the flow of outgoing products 2.

In the embodiment shown on FIG. 6, the conveying device 1 has no central plate 5 separating the infeed conveyor 3 and the outfeed conveyor 4. In fact, the products 2 are directly swept by the robotic means 7 from the infeed conveyor 3 to the predefined outfeed conveyor 4 out of the plurality of possible outfeed conveyors 4. The conveyors are close enough to avoid a gap which would disturb the movement of the products 2. As already said, the robotic means 7 moves the products 2 without lifting them, so that they are permanently contacting a conveyor, either the infeed or the outfeed.

As illustrated by FIG. 6, the outfeed conveyors 4 can be parallel to each other, and parallel to the infeed conveyor 3, one of said outfeed conveyor 4 being aligned with the infeed conveyor 3, preferably made with one common conveying belt. In some other embodiments, outfeed conveyors 4 extend from the side of the infeed conveyor 3, in a direction perpendicular to the longitudinal direction of the infeed conveyor 3. The robotic means 7 works to deliver each incoming product 2 to the outfeed conveyor 4 corresponding to the process flow said product 2 is to follow. Each product 2 can therefore be brought to a different outfeed conveyor 4 by a simple sweep movement, as the overall top conveying surface is flush.

The infeed conveyor 3, bringing products 2 to the working area 15, can also continue as an additional outfeed conveyor 4, which moves the products 2 out of the working area 15, in the same direction than the infeed direction 3.

While specific embodiments of the invention have been described in detail, it will be appreciated by those skilled in the art that various modifications and alternatives to those details, in addition to those discussed above, could be developed in light of the overall teachings of the disclosure. Accordingly, the particular arrangements disclosed are meant to be illustrative only, and not limiting as to the scope of the invention which is to be given the full breadth of the claims appended in any and all equivalents thereof, including any combination of their features.

The invention claimed is:

1. Conveying device (1), for conveying products (2) in an industrial processing line, said conveying device (1) comprising, for circulating the products (2), at least one infeed conveyor (3), for receiving the products (2) from a line portion upstream said device (1) and a plurality of outfeed conveyors (4), for further delivering the products (2) to a line portion downstream said device (1), said conveying device (1) acting as a sorting device and directing product (2) to a predefined outfeed conveyor (4), wherein the infeed conveyor (3) and the plurality of outfeed conveyors (4) extend in a common plane, the conveying device (1) further comprising a robotic means (7), with a working area (15) covering at least a portion of the at least one infeed conveyor (3) and at least a portion of each outfeed conveyor (4), for moving products (2) from said at least one infeed conveyor (3) to the predefined outfeed conveyor (4) of said plurality, with a movement parallel to said common plane, and the device further comprising, a central plate (5), defining a top fixed surface, mounted downstream from and abutted to the at least one infeed conveyor (3) and upstream from and abutted to each of the outfeed conveyors (4), the central plate (5) being flush with the at least one infeed conveyor (3) and each of the outfeed conveyors (4), wherein the products (2) are moved onto said central plate (5) from the at least one infeed conveyor (3) and then sorted and directed onto predefined outfeed conveyors (4) of the plurality.

2. Conveying device (1) according to claim 1, further comprising a gantry (6) on which the robotic means (7) is fixed above its working area (15).

3. Conveying device (1) according to claim 1, further comprising at least two infeed conveyors (3), one of the outfeed conveyors (4) feeding one of said infeed conveyors (3), thereby forming an accumulation portion (8) of the first-in-first-out type.

4. Conveying device (1) according to claim 1, wherein the at least one infeed conveyor (3) is upstream and aligned to at least one outfeed conveyor (4).

5. Conveying device (1) according to claim 1 wherein at least one outfeed conveyor (4) extends laterally from the infeed conveyor (3).

6. Conveying device (1) according to claim 1, further comprising a control unit (11) instructing the robotic means (7) for bringing the products (2) received from the at least one infeed conveyor (3) to one defined outfeed conveyor (4) of said plurality.

7. Conveying device (1) according to claim 1, further comprising a plurality of infeed conveyors (3), a or the control unit (11) of the conveying device (1) instructing the robotic means (7) for taking the products (2) from one defined infeed conveyor (3) of said plurality to bring it to the at least one outfeed conveyor (4).

8. Conveying device (1) according to claim 1, further comprising, in the working area (15), an intermediate station (12) to which the robotic means (7) temporarily brings the products (2) for processing, between their picking at the infeed conveyor outfeed conveyor (3) and their delivery at the (4).

9. Conveying device (1) according to claim 1, wherein at least one of the outfeed conveyors (4) is controllable for moving products (2) either from or to the working area (15), thereby forming an accumulation portion (8) of the first-in-last-out type.

10. Conveying device (1) according to claim 1, wherein at least one of the outfeed conveyors (4) comprises an endless belt defining a top moving surface on which products (2) are received.

11. Conveying device (1) according to claim 10, further comprising a gantry (6) on which the robotic means (7) is fixed above its working area (15).

12. Conveying device (1) according to claim 1, wherein the central plate is located in the working area (15) of the robotic means (7) and the robotic means (7) moves the products (2) onto said central plate (5) from the at least one infeed conveyor (3) and onto to the predefined outfeed conveyor (4) of the plurality.

13. Conveying device (1) according to claim 12, wherein the top surface of the central plate (5) is of a reduced friction.

14. Conveying device (1) according to claim 12, further comprising a gantry (6) on which the robotic means (7) is fixed above its working area (15).

15. Conveying process, comprising the steps of collecting products (2) from an upstream portion on a belt based infeed conveyor (3), and delivering said products (2) to a downstream portion on a predefined outfeed conveyor (4) of a plurality, extending in the same plane than said infeed conveyor (3), said process further comprising a transfer step executed by a robotic means (7) and consisting in receiving the products (2) on the infeed conveyor (3), sliding them in a horizontal plane and releasing them on the outfeed conveyor (4), sliding the products being done by sweeping the products, one at a time, onto a central plate (5), in abutment between the infeed conveyor (3) and the outfeed conveyor (4), wherein the products (2) are moved onto said central plate (5) from the at least one infeed conveyor (3) and then sorted and directed onto predefined outfeed conveyors (4) of the plurality.

16. Conveying process according to claim 15, wherein the products (2) are rotated to the vertical axis, during the transfer from the infeed conveyor (3) to the outfeed conveyor (4).

17. Conveying process according to claim 15, further comprising a recirculating step, during which products (2) released are brought back to the robotic means (7) after having circulated on an accumulation portion (8).

18. Conveying process according to claim 15, wherein the products (2) received from the upstream portion are stopped prior to being manipulated by the robotic means (7).

19. Conveying process according to claim 15, further comprising a distribution calculation step, executed by a control unit (11) piloting the robotic means (7), during which one specific conveyor is selected out of a plurality of infeed conveyors (3) for taking a product (2) therefrom with said robotic means (7), and/or one specific conveyor is selected out of a plurality of outfeed conveyors (4) for delivering a product (2) thereto with said robotic means (7).

20. Conveying process according to claim 15, wherein at least one of the outfeed conveyors (4) is controllable for moving products (2) either from or to the working area (15), thereby forming an accumulation portion (8) of the first-in-last-out type.

* * * * *